May 10, 1966 E. KENK 3,250,476
NOZZLE FOR MIXING CHEMICALS WITH WATER
Filed May 15, 1964 2 Sheets-Sheet 1
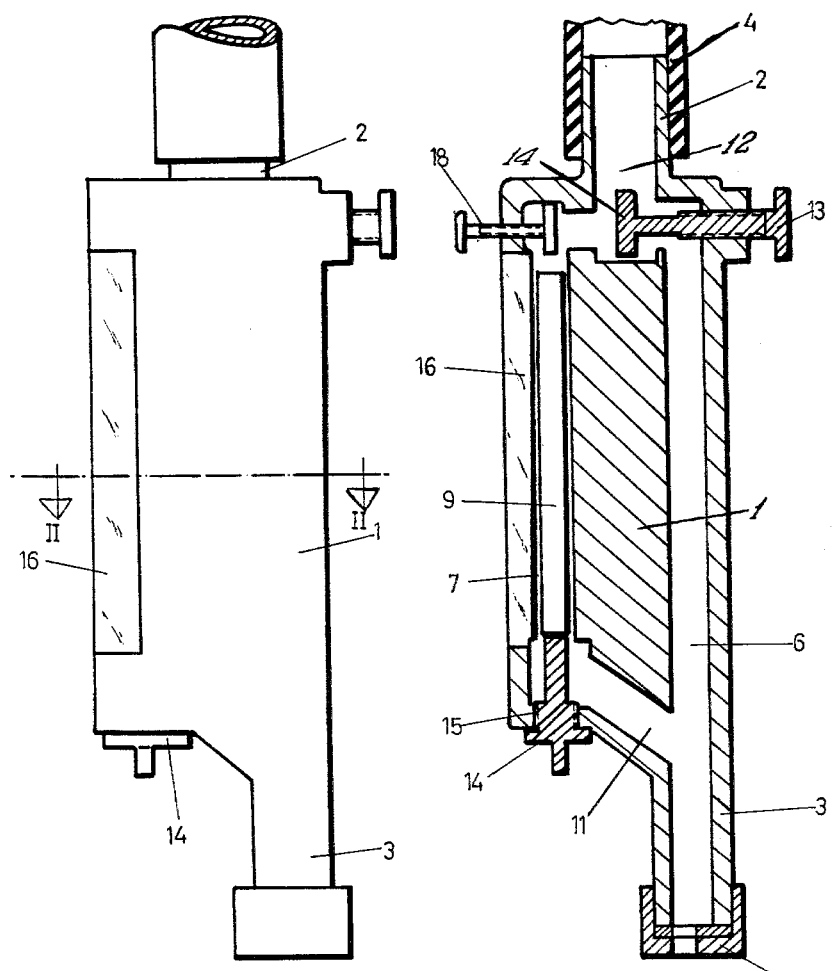
FIG.1
FIG.3
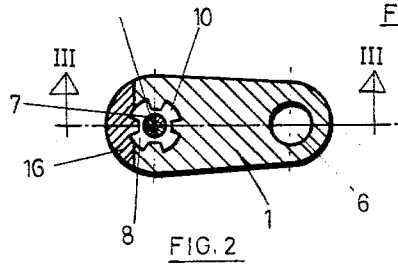
FIG.2
INVENTOR
*Erhard Kenk*
BY
*Michael J. Striker*
ATTORNEY

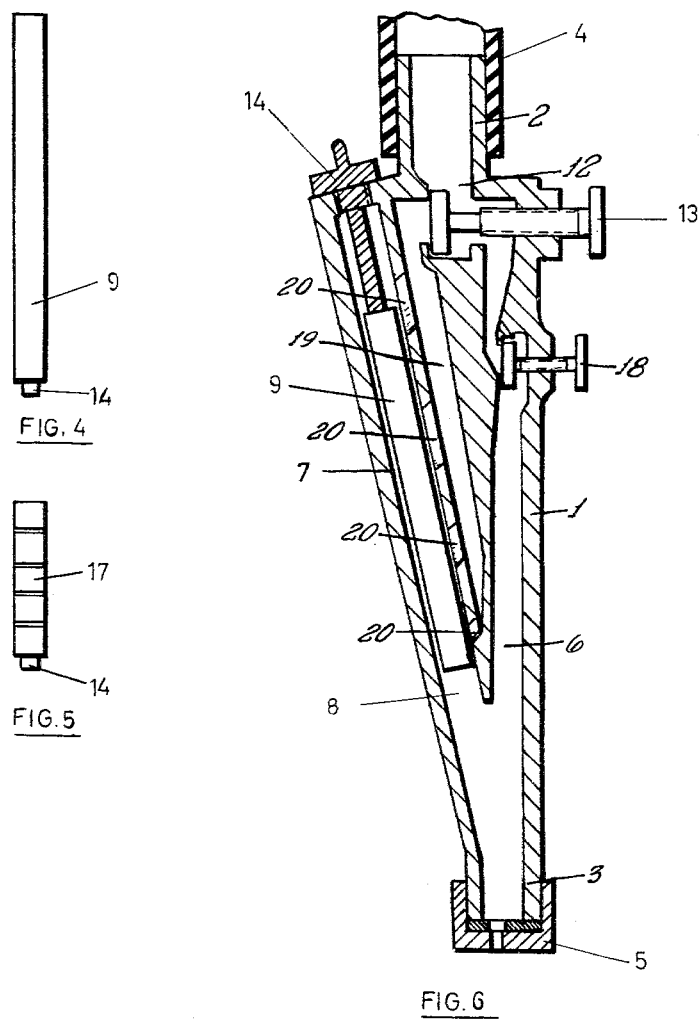

United States Patent Office 3,250,476
Patented May 10, 1966

3,250,476
NOZZLE FOR MIXING CHEMICALS WITH WATER
Erhard Kenk, Vaihingen (Enz), Nord, Germany
Filed May 15, 1964, Ser. No. 367,725
Claims priority, application Germany, May 21, 1963,
K 49,790
10 Claims. (Cl. 239—316)

The present invention relates to devices for mixing chemicals with water.

In particular, the present invention relates to that type of device which is adapted to be attached to a hose, for example, so that chemicals can be mixed with a flowing stream of water.

Devices of this type are particularly useful in connection with fertilizing of plants as well as in connection with control of plant, animal, and bacteriological pests. During the fertilizing or pest control operations as presently carried out it is necessary to first mix the chemicals, usually in powder form and carried by a suitable carrying substance in water so as to form a suitable solution, and suitable stirring devices and the like usually accelerate this process, and thereafter the resulting solution is sprayed by a hand pump or by a motor driven pump, and this solution can be delivered to a suitable nozzle for spraying purposes.

It is a primary object of the present invention to provide a device capable of providing a solution of chemicals which can be used for purposes such as fertilizing or pest control, but which does not require any preliminary preparations of solutions.

Thus, it is an object of the invention to provide a structure where the formation of the solution takes place simultaneously with the streaming of the water to a suitable spray device from where the solution is sprayed to a desired location, for example, so that preliminary operations and the time required thereby are completely eliminated with the structure of the invention.

Furthermore, it is an object of the invention to provide a structure of the above type which is capable of forming suitable chemical solutions in an accurate manner providing precisely determined proportions in the chemical solutions.

Also, it is an object of the present invention to provide a structure which will reliably protect the operator against any injury which might be encountered by direct contact with certain chemicals.

Furthermore, it is an object of the present invention to provide a structure which makes it extremely convenient to introduce chemicals into the device of the invention.

Furthermore, it is an object of the present invention to provide a structure of the above type which can be easily controlled not only for the purpose of turning the device on or off so as to start or stop the delivery of a spray of solution, but also for the purpose of controlling the extent to which the solution is concentrated.

Furthermore, it is an object of the present invention to provide a structure which will reliably indicate to the operator when it is necessary to add additional chemicals to the device.

An additional object of the present invention is to provide a device of the above type which can be attached in a convenient manner to a conventional hose.

Also, it is an object of the present invention to provide a structure which is capable of accomplishing all of the above objects while at the same time being extremely simple and inexpensive and very reliable in operation.

With the above objects in view the invention includes, in a device for mixing chemicals with water, an elongated nozzle having a tubular inlet and a tubular outlet, the tubular inlet of the nozzle being adapted to be connected to a suitable hose, for example, while the outlet serves to issue liquid from the nozzle. This nozzle is formed in its interior with an elongated bore communicating with the inlet and the outlet and functioning as a mixing chamber in which a chemical substance is dissolved in water streaming through the bore, so that in this way a solution is provided at the outlet of the nozzle which is suitbale for purposes such as fertilizing, pest control and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevation of one possible embodiment of a device constructed in accordance with the present invention;

FIG. 2 is a transverse sectional view of the structure of FIG. 1 taken along line II—I of FG. 1 in the direction of the arrows;

FIG. 3 is a longitudinal sectional elevation of the embodiment of FIGS. 1 and 2, taken along line III—III of FIG. 2 in the direction of the arrows;

FIG. 4 illustrates the water-soluble chemical substance in elongated stick form;

FIG. 5 illustrates the water-soluble chemical substance in tablet form; and

FIG. 6 is a longitudinal sectional illustration of another embodiment of a device according to the invention.

Referring now to FIGS. 1–3, the structure of the invention includes a nozzle 1 formed, as shown most clearly in FIG. 3, with a tubular inlet 2 and with a tubular outlet 3. The tubular inlet 2 is adapted to be inserted into an end of a hose 4 so that water may be delivered to the tubular inlet 2 of the nozzle 1. The tubular outlet 3 of the nozzle, through which liquid discharges from the nozzle, carries a device such as a spray nozzle 5.

The nozzle 1 is formed in its interior with a first elongated bore 6 which communicates with the tubular inlet 2 and with the tubular outlet 3, and in addition the nozzle is formed with a second elongated bore 7 which forms a mixing chamber 8. This mixing chamber 8 is adapted to receive chemicals in the form, for example, of a solid body having the configuration of a stick 9, shown by itself in FIG. 4, so that when water flows over the body, such as the stick 9, the chemicals thereof will dissolve in the water. As is apparent from FIG. 3, the bore 7 also communicates with the inlet 2 and the outlet 3. In order to increase the cross sectional area of the bore 7 so that more water will flow therethrough, the bore 7 is formed, as shown most clearly in FIG. 2, with a plurality of elongated grooves 10 communicating with the interior of the bore 7, all having the same width, and being uniformly distributed about the axis of the bore 7, so that in this way the cross section of the bore is increased in the manner shown in FIG. 2.

As was pointed out above both of the bores 6 and 7 communicate with the inlet 2, and in the region of the outlet 3 the nozzle is formed with a transverse bore 11 providing communication between the bores 6 and 7.

As may be seen from FIG. 3, the nozzle has in its interior a space through which the bores 6 and 7 communicate with the inlet 2, and this space 12, from which the bores 6 and 7 branch, is adapted to accommodate a valve member 14 of a manually operable mixing valve means 13 which is accessible to the operator at the exterior of the nozzle, so that by suitable adjustment of the valve means 13 the position of the valve member 14 in the space 12 can be regulated so as to control the proportioning of the water flowing through the inlet 2 between the bores 6 and 7. It is to be noted from FIG. 3 that the valve means 13 is movable between a pair of end positions in which the bores 6 and 7 are closed. Thus, it is possible with the mixing valve 13 to control the manner in which the water flows through the elongated bores 6 and 7.

The chemicals are introduced into the mixing chamber 8 in the form of solid bodies having the configuration of sticks or tablets, and a series of such tablets are illustrated in FIG. 5. In order to have access to the bore 7 a wall portion of the nozzle is formed with a threaded opening 15 which is coaxial with the bore 7, and a plug means 14 is threaded into the opening 15 so as to close the opening 15. However, when the plug 14 is moved it is possible to introduce the chemicals either in the form of a stick 9 or in the form of the tablets 17 into the bore 7, and then the plug means 14 is replaced in its position closing the opening 15.

Part of the nozzle 1 is in the form of an elongated transparent wall 16 through which the interior of the bore 7 may be seen by the operator, so that the operator will know when the chemical materials have been consumed and can take the necessary steps to replace the chemical materials. The sticks 9 can have different lengths as well as being made of different materials, or any selected combination of tablets 17 may be brought into the mixing chamber 8. This mixing chamber can be closed also by an additional valve means 18 which is carried by the nozzle 1 and which is accessible to the operator solely for the purpose of closing the chamber 8. Thus, besides controlling the flow through the mixing chamber it is also possible to control the entire flow of liquid through the device.

In the embodiment of the invention which is illustrated in FIG. 6, the bores 6 and 7 are inclined at relatively sharp angle and intersect each other with a relatively small acute angle, as shown in FIG. 6, in the region of the outlet 3 of the nozzle. It is to be noted that while in FIG. 3 the second valve means 18 is positioned so as to cooperate with the bore 7 for closing and opening the latter, the second valve means 18 of FIG. 6 is situated in the bore 6 so as to be capable of closing and opening the latter, so that in fact since the valve means 13 can completely close the bore 7, it is clear that the valve 18 performs in FIG. 6 the same function as in FIG. 3. In other words, with the combination of valves of FIG. 3 or FIG. 6 it is possible to individually close and open the separate bores as well as to control the extent to which the water received in the inlet is transmitted between the bores, the mixing valve 13 of FIG. 6 being adjustable to control the proportioning of the liquid between the bores, in much the same way as the mixing valve means 13 of FIG. 3.

In the embodiment of FIG. 6 the nozzle 1 is provided in the bore 7 with an elongated partition forming a bore portion 19 which tapers toward the outlet 3, and this partition of the bore 7 is formed with a plurality of openings 20 passing therethrough and being of a gradually smaller size as they are located nearer to the outlet 3, so that as the liquid flows from the space 19 through the openings 20 into the mixing chamber 8 the entire length of the stick 9 will be substantially uniformly engaged by the water. The location of the smaller openings 20 nearer to the outlet 3 will maintain the flow throughout the chamber 8 substantially constant since the portions of the chamber 8 nearer to the outlet 3 will receive liquid from portions of the chamber 8 which are more distant from the outlet 3, so that the smaller openings 20 compensate for the particular location of the chamber 8 where the liquid flows through the openings 20 into the latter to engage the water-soluble stick 9.

The plug means 14 is of such a construction that it supports the bodies of chemical substances which are soluble in water in the mixing chamber 8. These chemical materials are in the form of solid bodies which may be manufactured by compacting the chemicals so as to form the tablets or sticks, as described above. Thus, part of the water which reaches the inlet of the nozzle flows over the solid body of water-soluble chemical materials, and surrounds the body while flowing past the same so as to dissolve gradually material away from the body, thus forming a solution which joins the clear water flowing through the bore 6 at the outlet of the nozzle. Therefore, with the invention there is no requirement of time for preparing the solutions which must be sprayed. The chemicals can be used in pure form, and no mixing is necessary before use of the structure. As a result there are very low manufacturing, filling, packaging, and transporting costs.

For the purpose of controlling the concentration of the chemicals the amount thereof which is introduced into the mixing chamber can be regulated as by choosing a suitable size of stick 9 or a suitable number of tablets 17. Moreover, the stick or tablets can be formed with bores passing therethrough and enabling them to be threaded directly onto the elongated portion of the plug means 14 which extends into the mixing chamber, so that in this way the chemical substances can be supported in the mixing chamber. Of course, while the concentration of this solution can be controlled by the number of tablets or the size of the stick which is introduced into the chamber, one must also take into consideration the dissolving capacity of the individual chemicals. With chemical substances which are harmful to human beings when directly engaged by the human being, it is possible to provide on the solid body a protective covering which is also soluble in water. Thus, with such an arrangement the person touching the body will not be harmed, but after it has been situated in the mixing chamber the water flowing past the body will dissolve away the protective coating and then the chemical substances will become dissolved. The combination of chemicals can contain suitable substances which will act as water softeners, and in addition it is possible to include in the chemicals substances which by their reaction with water will generate a heat which can be used for relatively delicate plants as well as for combatting conditions of frost, particularly in vineyards. Chemicals which by their nature have a very large capacity for being dissolved in water can have combined with suitable hardening constituents so as to regulate the speed with which such substances become dissolved in water.

While the valve means described above are adjustable to any desired position, it is also possible to use with the invention a known type of valve means which can be manually operated so as to be quickly placed either in a fully closed position or in a fully open position. Of course, with the structure as shown it is possible to adjust the mixing valve 13 so as to take into consideration the speed with which the chemical substances dissolve, so that the use of a fully adjustable mixing valve 13 is of course preferred. The embodiment of FIG. 6 is particularly suitable when it is desired to introduce into the maxing chamber different chemical materials. With this arrangement the resulting solution will be uniformly maintained with the same fractional parts being derived from the different chemical materials in the mixing chamber because of the arrangement of the tapered bore 19 and the openings 20 which become of a smaller size toward the outlet 3.

While a simple spray control device 5 may be attached to the end 3 of the nozzle 1 for the purpose of controlling the stream which issues from the nozzle, it is also possible, instead, to attach to the nozzle 1 for the purpose of controlling the stream which issues from the nozzle, it is also possible, instead, to attach to the nozzle suitable spray or sprinkling installations which are commonly used in gardens, or an elongated spray member used for spraying trees may be attached to the outlet 3 of the nozzle.

It will be understood that each of the elements described above, or two or more together, may also find a useful application in other types of devices for mixing chemicals with water differing from the types described above.

While the invention has been illustrated and described as embodied in nozzles for mixing chemicals with water, it is not intended to be limited to the details shown, since various modifications and structural changes may be made without departing in any way from the spirit of the present invitation.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for mixing chemicals with water, in combination, an elongated nozzle having a tubular inlet adapted to be attached to a hose and a tubular outlet through which liquid is adapted to discharge, said body being formed in its interior with an elongated bore communicating with said inlet and outlet and forming a mixing chamber, and said nozzle having a wall formed with an opening communicating with said bore; plug means carried by said wall in said opening thereof for closing said opening, said plug means extending into said bore and supporting therein a solid body of a chemical substance soluble in water, said body being introducible into said bore through said opening thereof and having before it is introduced into said bore a protective covering to protect the operator from the chemical substance, said protective covering being also soluble in water so that as water initially streams over said body in said bore of said nozzle, said protective covering is initially washed away and then the chemical substance is dissolved in the water to issue therewith from said outlet of said nozzle.

2. In a device for mixing chemicals with water, in combination, an elongated one-piece nozzle having a tubular inlet adapted to be attached to a hose and a tubular outlet through which liquid discharges from said nozzle, said nozzle being formed in its interior with an elongated first longitudinal bore through which only water is adapted to flow and with a longitudinal second elongated bore which forms a mixing chamber in which a chemical material soluble in water is adapted to dissolve in water streaming through said second bore, said first and second longitudinal bores communicating with said tubular inlet of said nozzle and said nozzle being formed with a transverse bore providing communication between that end of said second bore which is nearest to said outlet and said first bore.

3. In a device for mixing chemicals with water, in combination, an elongated one-piece nozzle having a tubular inlet adapted to be attached to a hose and a tubular outlet through which liquid discharges from said nozzle, said nozzle being formed in its interior with a first elongated bore communicating with said inlet and outlet and through which water is adapted to flow, and said nozzle being formed with an elongated second bore communicating also with said inlet and outlet and through which water is also adapted to flow, said second bore forming a mixing chamber and being adapted to contain a chemical substance which dissolves in the water flowing through said second bore, said nozzle being formed at said second bore thereof with a plurality of longitudinal grooves extending parallel to the axis of said second bore, having uniform widths, and uniformly distributed about the axis of said second bore, so that said grooves increase the cross sectional area of said second bore and thus increase the area through which water can flow through said second bore past a chemical substance therein to form said chemical substance a solution which joins the water flowing through said first bore to issue therewith from said outlet.

4. In a device for mixing chemicals with water, in combination, an elongated one-piece nozzle having a tubular inlet adapted to be atached to a hose, a tubular outlet through which liquid is adapted to discharge from the nozzle, and being formed with a first bore communicating with said inlet and outlet and through which water is adapted to flow and with a second bore also communicating with said inlet and outlet and forming a mixing chamber, said second bore being adapted to contain a chemical substance which dissolves in water flowing through said second bore to form therewith a solution which joins the water flowing through said first bore to issue therewith from said outlet, said nozzle having at the junction between said tubular inlet and said first and second bores a space opening into both of said bores; and mixing valve means located in said space and extending to the exterior of said nozzle so as to be accessible to the operator for adjustment to determine the distribution of the water flowing into said inlet between said first and second bores, said mixing valve means being adjustable between a pair of end positions in which said bores are respectively closed by said mixing valve means.

5. In a device for mixing chemicals with water, in combination, an elongated nozzle having a tubular inlet adapted to be attached to a hose, a tubular outlet through which liquid is adapted to discharge from the nozzle, and being formed with a first bore communicating with said inlet and outlet and through which water is adapted to flow and with a second bore also communicating with said inlet and outlet and forming a mixing chamber, said second bore being adapted to contain a chemical substance which dissolves in water flowing through second bore to form therewith a solution which joins the water flowing through said first bore to issue therewith from said outlet, said nozzle having at the junction between said tubular inlet and said first and second bores a space opening into both of said bores; mixing valve means located in said space and extending to the exterior of said nozzle so as to be accessible to the operator for adjustment to determine the distribution of the water flowing into said inlet between said first and second bores, said mixing valve means being adjustable between a pair of end positions in which said bores are respectively closed by said mixing valve means; and a second valve means carried by said nozzle in said second bore at the region where it communicates with said space for cutting off communication between said second bore and said space when said second valve means is placed by the operator in a closed position.

6. In a device for mixing chemicals with water, in combination, an elongated nozzle having a tubular inlet adapted to be attached to a hose, a tubular outlet through which liquid is adapted to discharge from the nozzle, and being formed with a first bore communicating with said inlet and outlet and through which water is adapted to flow and with a second bore also communicating with said inlet and outlet and forming a mixing chamber, said second bore being adapted to contain a chemical substance which dissolves in water flowing through said second bore to form therewith a solution which joins the water flowing through said first bore to issue therewith from said outlet, said nozzle having at the junction between said tubular inlet and said first and second bores a space opening into both of said bores; mixing valve means located in said space and extending to the exterior of said nozzle so as to be accessible to the operator for adjustment to determine the distribution of the water flowing into said inlet between said first and second bores; and a second valve means carried by said nozzle in said first bore for closing said first bore when said second valve means is placed in a closed position by the operator, so as to prevent water from flowing through said first bore as long as said second valve means is maintained in its closed position.

7. In a device for mixing chemicals with water, in combination, an elongated nozzle having a tubular inlet adapted to be attached to a hose and a tubular outlet through which liquid discharges from said nozzle, said nozzle being formed in its interior with an elongated first bore communicating with said inlet and outlet and through which water is adapted to flow, and said nozzle also being formed in its interior with an elongated second bore having an axis which is inclined at a relatively small acute angle with respect to the axis of said first bore, said second bore also communicating with said inlet and outlet and adapted to contain a chemical substance which is soluble in water to form therewith a solution which joins the water flowing through said first bore to issue therewith from said outlet of said nozzle, said first and second bores intersecting in the region of said outlet.

8. In a device for mixing chemicals with water, in combination, an elongated nozzle having a tubular inlet adapted to be attached to a hose and a tubular outlet through which liquid discharges from said nozzle, said nozzle being formed in its interior with an elongated first bore communicating with said inlet and outlet and through which liquid is adapted to flow, said nozzle also being formed in its interior with a second bore having an axis which is inclined at a relatively small acute angle with respect to the axis of said first bore, said second bore also communicating with said inlet and outlet, said nozzle carrying in said second bore an elongated partition which divides said second bore into a pair of bore portions separated from each other by said partition, and said partition being formed with a plurality of openings passing therethrough, distributed longitudinally of said nozzle along said partition, and being of gradually smaller sizes as they are located nearer to said outlet, the portion of said second bore which receives water flowing through said openings of said partition being adapted to contain a chemical substance soluble in water to be dissolved with water flowing through said second bore so as to join with the water flowing through said first bore a solution of the chemical substance in said second bore.

9. In a device as recited in claim 8, the portion of said second bore which communicates with said inlet and through which liquid must flow before reaching said openings of said partition tapering toward said outlet of said nozzle.

10. In a device as recited in claim 9, a mixing valve means carried by said nozzle, accessible at the exterior of said nozzle for adjustment, and situated in the interior of said nozzle at the junction between said first and second bores and said tubular inlet for controlling the proportions of the liquid flowing through said inlet which are delivered to said first and second bores.

References Cited by the Examiner

UNITED STATES PATENTS

| 1,288,824 | 12/1918 | Burns | 239—315 |
| 1,579,869 | 4/1926 | Klages | 239—315 |
| 1,656,334 | 1/1928 | McKenney | 239—315 |
| 1,687,085 | 10/1928 | Dow | 239—315 |
| 2,120,774 | 6/1938 | Belmont | 239—317 |
| 2,165,868 | 7/1939 | Martin | 239—317 |
| 2,325,758 | 8/1943 | Ferguson | 239—315 |
| 2,814,528 | 11/1957 | Blasczyk | 329—315 |

FOREIGN PATENTS

| 8,912 | 6/1915 | Great Britain. |

M. HENSON WOOD, Jr., *Primary Examiner.*

ROBERT B. REEVES, *Examiner.*

R. S. STROBEL, *Assistant Examiner.*